United States Patent [19]

Mawhinney et al.

[11] Patent Number: 4,761,821
[45] Date of Patent: Aug. 2, 1988

[54] RADIO FREQUENCY SIGNAL TRANSMISSION SYSTEM WITH CARRIER FREQUENCIES AT OPPOSITE EDGES OF THE CHANNEL

[75] Inventors: Daniel D. Mawhinney, Livingston; Robert E. Askew, Belle Mead, both of N.J.

[73] Assignee: RCA Corporation, Princeton, N.J.

[21] Appl. No.: 885,783

[22] Filed: Jul. 15, 1986

[51] Int. Cl.$^4$ .............................................. H04B 1/50
[52] U.S. Cl. ...................................... 455/73; 455/86; 455/87; 455/103; 455/104
[58] Field of Search ...................... 455/68, 73, 86, 87, 455/103, 104; 370/69.1

[56] References Cited

U.S. PATENT DOCUMENTS

| | | | |
|---|---|---|---|
| 1,458,949 | 6/1923 | Nichols | 455/104 |
| 1,818,669 | 8/1931 | Beckmann | 455/57 |
| 2,388,906 | 11/1945 | Corderman | 455/104 |
| 3,041,450 | 6/1962 | Parker | 455/103 |
| 4,186,344 | 1/1980 | Higuchi et al. | 455/86 |

Primary Examiner—Michael A. Masinick
Attorney, Agent, or Firm—Henry I. Steckler; Allen LeRoy Limberg

[57] ABSTRACT

A radio frequency transmitter simultaneously transmits both a local oscillator frequency and that frequency modulated by an information content signal. A receiver receives a carrier wave that is at the opposite edge of a channel from that of the local oscillator. The transmitted and received information signals can be of opposite type sidebands.

7 Claims, 1 Drawing Sheet

RADIO FREQUENCY SIGNAL TRANSMISSION SYSTEM WITH CARRIER FREQUENCIES AT OPPOSITE EDGES OF THE CHANNEL

BACKGROUND OF INVENTION

1. Field of Invention

This invention is concerned with a radio frequency (RF) signal transmission system, and more particularly with such a system which utilizes heterodyne techniques.

2. Description of the Prior Art

Basic RF communications systems consist of transmitters and receivers. Commonly, heterodyne techniques are used to up-convert the baseband information frequency to the transmitter carrier frequency. Conversely, at the receiver, a down-converter is used to extract the baseband signal from the received carrier frequency. To control the baseband frequency so that it falls within the IF (intermediate frequency) amplifier bandwidth at the receiver end, the local oscillators used as the heterodyne frequency sources for the respective up-converter and down-converter must be accurately controlled. If the baseband frequency must be reproduced at the receiver within a specific error range ($\Delta F$), the two local oscillators must be within $\Delta F$ of each other. If the baseband frequency must be preserved exactly, the frequencies of the two oscillators must be identical. However, in most applications, the communications process can usually be adequately served with oscillators of crystal-control stability or of even lesser stability.

For a short-range communications link, especially one involved in transmission of wideband digitally coded data, it may be necessary to preserve the baseband frequency closely because of band allocations for the various modulation elements of a complex baseband signal. Expensive crystal controlled frequency synthesizer type local oscillators would be required, should conventional communications link techniques be employed. Where the character of the coded data is such that phase coherence is required for simplified decoding at the receiver, complicated phaselock and clock regeneration circuits would be required.

It is also known to have a system involving an interrogator and a transceiver. The interrogator sends a radio frequency signal to the transceiver which modulates the signal with some code and retransmits the thus modulated signal back to the interrogator which uses its radio frequency signal to demodulate the modulated return signal.

SUMMARY OF THE INVENTION

In accordance with a preferred embodiment of the present invention, there is provided a radio frequency transmitter. The transmitter comprises a local oscillator, means responsive to the local oscillator signal and to an information signal for modulating the local oscillator signal with the information signal, means for transmitting both the local oscillator frequency and at least one sideband modulated radio frequency signal.

DETAILED DESCRIPTION OF THE PREFERRED EMBODIMENT

Figure 1:
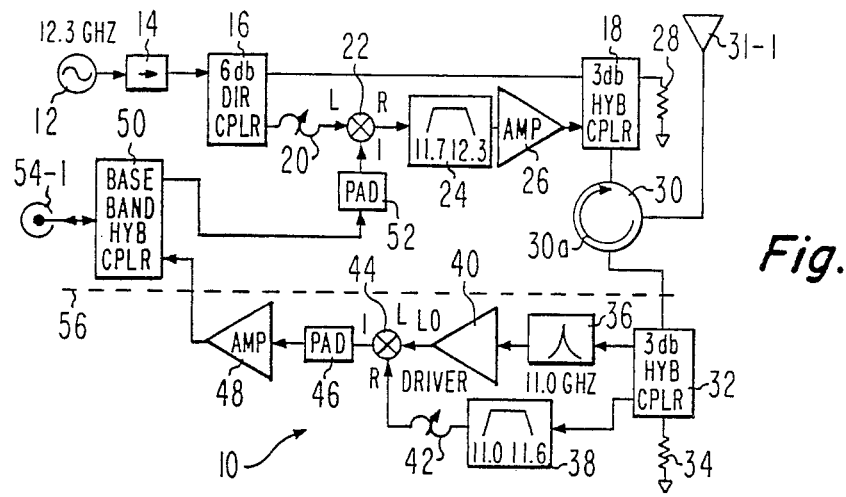
FIGS. 1 and 2 are transmitter/receivers (T/R) in accordance with a preferred embodiment of the present invention.

Referring first to FIG. 1, which illustrates a first T/R 10, a local oscillator 12 having an exemplary frequency of 12.3 gigahertz (GHz) is connected to an isolator 14, the output of which is connected to a 6 db directional coupler 16. Coupler 16 has two outputs, one connected to a 3 db hybrid coupler 18 acting as a signal combiner, and one connected to a line stretcher or delay line 20. A typical power level of the local oscillator signal as passed from coupler 16 to coupler 18 is 13 dBm or decibels referenced to a milliwatt. The output of line stretcher 20 is connected to one input of an amplitude modulation mixer 22. The output of mixer 22 is coupled to the input of a bandpass filter 24. If a local oscillator frequency 12.3 GHz is modulated by a signal that can be, say up to 500 megahertz (MHz), then the resulting output of mixer 22 would be 11.8 GHz to 12.8 GHz. However, it is desired to only transmit the half of the modulated signal which is at or below 12.3 GHz. Thus bandpass filter 24 effectively clips off all frequencies above the local oscillator frequency of 12.3 GHz and below the lowest modulated frequency of 11.8 GHz. In fact, cut off is at 11.7 GHz to allow for a little tolerance in the input signal.

The output of bandpass filter 24 is coupled to an amplifier 26 and its output is coupled to the second input of hybrid coupler 18. The power level at the output of amplifier 26 is typically −11 dBm. Coupler 18 has two outputs, one connected to a resistor 28 having a value equal to the characteristic impedance of the coupler and the other connected to one input of a three port circulator 30. Arrow 30a indicates signal direction within circulator 30. A second port of circulator 30 is coupled to a T/R antenna 31-1. A third port of circulator 30 is coupled as one input of a 3 db hybrid coupler 32 acting as a signal splitter.

Another connection of coupler 32 is to a terminating resistor 34 having a value equal to the characteristic impedance of the hybrid coupler 32. Coupler 32 has two outputs, one connected to a narrowband filter 36 and one connected to a broadband filter 38. The exemplary frequencies of those two filters 36 and 38 do not seem to match any frequencies discussed so far. In fact they do not, but rather match frequencies of the T/R FIG. 2 to be discussed hereinafter.

The output of filter 36 is coupled to the input of a driver amplifier 40 while the output of filter 38 is coupled to a line stretcher or delay line 42. The outputs of driver amplifier 40 and line stretcher 42 are coupled to respective inputs of a mixer 44. The output of mixer 44 is coupled to an attenuator (PAD) 46. The output of attenuator 46 is connected to a high gain amplifier 48. The output of amplifier 48 is coupled as one input of a baseband hybrid coupler 50. An output of baseband hybrid coupler 50 is coupled to an attenuator 52 the output of which is coupled as one input of mixer 22. Baseband hybrid coupler 50 is also coupled to a data bus terminal 54-1 into which and out from which flow signal data of interest.

Figure 2:
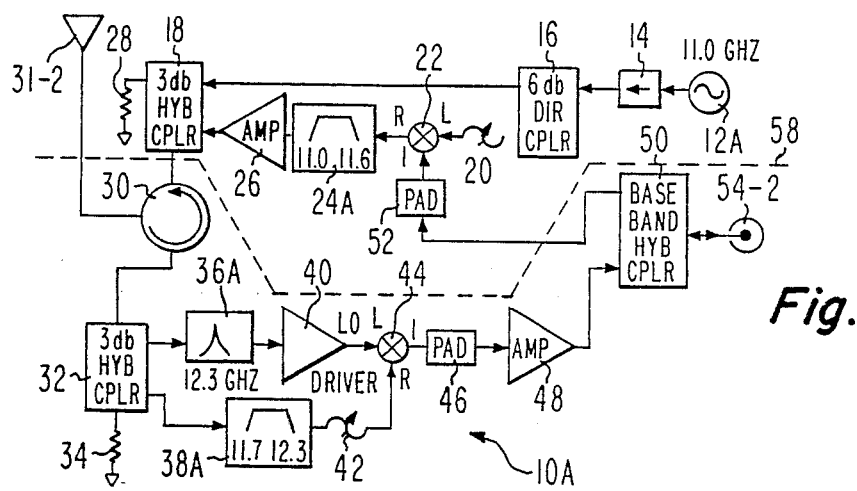

Turning now to FIG. 2 which is another transmitter/receiver typically identical in all respects but one to the transmitter/receiver of FIG. 1. The one exception is that different frequencies are produced and utilized within the T/R of FIG. 2 than are produced and utilized within the T/R of FIG. 1. All components which may be absolutely identical to those of FIG. 1 carry the same legend numbers (in two instances followed by a dash and a number). Those which may be substantially identical except for utilizing different frequencies than those described in connection with FIG. 1 are legended with the letter A following the number utilized for the same component in FIG. 1. Thus, for example, oscillator 12A, FIG. 2 differs only from oscillator 12, FIG. 1 in that it has a different frequency, an exemplary frequency being 11.0 GHz.

Broadband filter 24A is arranged to pass that exemplary frequency 11 GHz and one sideband thereabout, namely the positive sideband of 0.6 GHz. This is to allow for a transmission of a 500 MHz signal with some tolerance. Narrowband filter 36A is set to pass essentially only the frequency of local oscillator 12, FIG. 1. Broadband filter 38A, FIG. 2, is set to pass the same band of frequencies as filter 24, FIG. 1.

In theory since only an 11.7 to 12.3 GHz signal is present at antenna 31-2, filter 38A should not be needed. But in fact, circulator 30 is not perfect such that the 11 GHz local oscillator signal would, for example, be passed via circulator 30 to coupler 32 and then to mixer 44.

Figure 3:
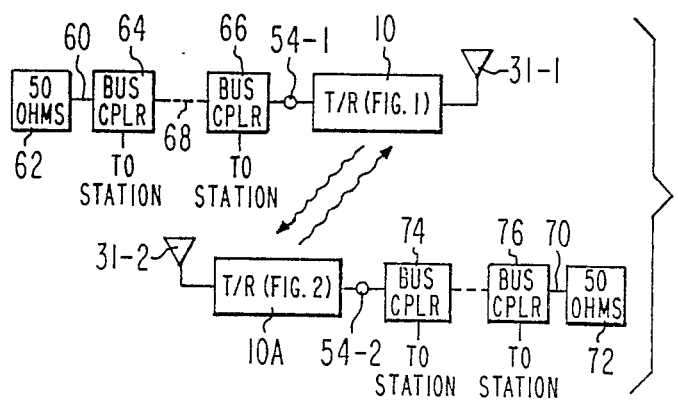
FIG. 3 is a system incorporating the transmitter and receiver of the instant invention in a signal transmission system.

With reference now to FIG. 3, the T/Rs of FIGS. 1 and 2 are illustrated in a system. In FIG. 3, antennas are shown outside the T/R 10 and T/R 10A respectively. Also these antennas in FIG. 3 are labeled 31-1 and 31-2 respectively. Also in FIG. 3, the bus connections are shown outside the T/R blocks 10 and 10A respectively and are legended 54-1 and 54-2 respectively. Connection 54-1 is connected to a bus 60 terminated at its distal end in its characteristic impedance indicated as a block 62. Along the bus are connected bus couplers, two, 64 and 66 being exemplary. The dashed portion of cable 60 legended 68 indicates a cable of a desired length and perhaps having many more bus couplers than the two exemplary ones shown. Connection 54-2 is similarly connected to a similar bus 70 terminated in its characteristic impedance as illustrated by a block 72. A plurality of bus couplers such as 74 and 76 are coupled to bus 70. The bus couplers 64, 66, 74 and 76 and others not illustrated are connected to various stations (not shown). The stations might include TV camera, TV monitors, voice receivers or transmitters, or sources or receivers of digital information. One exemplary use of such a system as illustrated in FIG. 3 is in a military tank where for example T/R 10 and all components illustrated to the left thereof may be in the tank turret while T/R 10A and all the components illustrated to its right in FIG. 3 may be located in the tank hull. Thus, antennas 31-1 and 31-2 are proximate one another.

Operation of the circuits of FIGS. 1 and 2 will now be described. Assume first that some signal is applied from bus connection 54-1 to hybrid coupler 50 of T/R 10 to be transmitted to T/R 10A. That signal may be, for example, a data signal, an audio signal, or a video signal or a combination thereof. When T/R 10 is operating as a transmitter, only those components above dashed line 56 are of interest. The signal appearing at terminal 54-1 is in effect passed to mixer 22 to be mixed with the local oscillator signal from source 12. The resulting signal output from mixer 22 will therefore contain a frequency band of 12.3 GHz plus and minus as much as 500 MHz. Because of the presence of filter 24, the upper sideband is removed leaving a 12.3 GHz single sideband-modulated signal. Thus, both the 12.3 GHz, pure oscillator signal and 12.3 GHz modulated signal are applied to coupler 18 which acts as a combiner. As a result, the combined signal passes through circulator 30 to antenna 31-1. Therefore, what is transmitted by antenna 31 is both a modulated radio frequency signal, which is the conventional signal transmitted by a transmitter, and the local oscillator signal itself. That dual signal is received at antenna 31-2 of T/R 10A.

It should be understood that the 12.3 GHz components of the modulated signal is of low power relative to the signal component passed directly from coupler 16 to coupler 18. This is true because only a relatively small amount of power is passed by coupler 16 to mixer 22 and further because filter 24 cannot cut off precisely at 12.3 GHz. Thus, either the 12.3 GHz signal is partially cut off or part of the upper sideband is transmitted which is not desired. Thus, if direct 12.3 GHz power is not added to the modulated signal, not enough 12.3 GHz power would be available in the receiver to demodulate the information signal. As mentioned earlier, it is an approximately 13 dBm local oscillator signal being combined in coupler 18 with an approximately −11 dBm modulated signal.

In FIG. 2, those components above dashed line 58 are utilized only for transmission and therefore are not of concern in the discussion which immediately follows concerning the use of T/R 10A as a receiver. The dual signal appearing at antenna 31-2 of T/R 10A is passed by a circulator 30 through coupler 32 acting as a splitter.

The local oscillator frequency of the FIG. 1 T/R is separated from the composite spectrum in narrowband filter 36A while the modulated signal that is the carrier signal and its lower sideband is separated in filter 38A. The resulting signals from filters 36A and 38A are subtractively mixed in mixer 44 to thus reconstruct the signal applied at bus connection 54-1 of T/R 10. It should be noted that in the prior art it would be local oscillator 12A that would be coupled in place of the output signal from filter 36A at mixer 44. Therefore, the signal at output terminal 54-2 would not have the same frequency as that input at terminal 54-1. Alternatively, a 12.3 GHz phase-locked oscillator would have to separately feed mixer 44, thus increasing the complexity of the T/R system. If the relatively high power local oscillator signal were not transmitted from the transmitter of FIG. 1, no demodulation would occur in mixer 44. This is so because it takes about 8 dBm local oscillator signal to cause the mixing action to occur whereas the modulated signal is at best about −11 dBM at the transmitter FIG. 1, and less of the receiver, FIG. 2.

The line stretchers 20 and 42 are used to adjust the overall transmission paths length of the separated local oscillators signal so that the overall phase shift of both paths to the mixer will be equal thereby providing phase tracking over a wider bandwidth. It should be understood that transmitter portion of T/R 10A operates identically to the transmitter portion of T/R 10 so its operation will not be herein discussed. Furthermore, the operation of the receiver portion of T/R 10 operates in a manner identical to that described in connection with the operation of T/R 10A so its operation will not be described.

Referring now to FIG. 3, T/R 10, when operating as a transmitter, receives signals from any of the bus couplers 64, 66 or others when a station connected thereto desires to transmit a signal. Then T/R 10 operates in a manner above described to transmit a dual signal to antenna 31-1 that is, one containing both the local oscillator frequency of the transmitter and the modulated local oscillator signal. Those dual signals are received by antenna 31-2 of T/R 10A and are manipulated in a manner previously described in connection with T/R 10A of FIG. 2 to provide a signal which is passed to bus 70 and transmitted to any one or more of bus couplers 74, 76 and others (not shown) to be utilized by their respective stations (not shown). The reverse operation may equally well occur, that is a signal originating at any of the stations coupled to bus coupler 74, 76 and others (not shown) and passed to T/R 10A which then transmits an appropriate dual signal via antenna 31-2 to antenna 31-1. In that situation, T/R 10 being responsive to the dual signal reproduces exactly in frequency at terminal 54-1 the signal received at terminal 54-2.

We claim:

1. A pair of radio frequency transmitter/receivers, each comprising in combination:
   a local oscillator producing a signal at a given frequency, the frequencies differing from one another;
   means for modulating the local oscillator frequency with an information content signal to produce a modulation signal including the local oscillator froquency and only one sideband corresponding to the information signal, the sideband of the lower of of said local oscillator frequencies being an upper sideband, the sideband of the higher of said local oscillator frequencies being a lower sideband; and
   means for combining the local oscillator signal and modulated signal and for simultaneously transmitting the resulting combined signal:
   means receptive of the transmitted combined signal for splitting the signal into two signals;
   means responsive to one of said two signals for recovering a signal having the value of the given frequency of the local oscillator of the other of the pair;
   means responsive to the other of the two signals for producing a signal corresponding to the modulated sideband produced by the other of the pair; and
   means for subtractively mixing the two reconstructed signals to produce said information content signal.

2. The combination as set forth in claim 1 wherein said means for simultaneously transmitting comprises a hybrid coupler receptive of said local oscillator signal and modulated local oscillator signal for producing a combined signal and further comprising an antenna coupled to the output of said coupler for transmitting the combined signal.

3. The combination as set forth in claim 1 wherein said means for splitting separating said combined signal comprises a hybrid coupler responsive to said combined signal for producing two output signals and first and second filters coupled to the respective outputs of said coupler, one being a narrowband filter for producing at its output only the local oscillator frequency and one being a broadband filter for passing the modulated local oscillator signal.

4. A radio-frequency transmitter/receiver comprising:
   an antenna tuned to be operative over a transmission frequency channel and an adjacent reception frequency channel, each of which channels is of a width commensurate with a given baseband;
   a circulator having an antenna port connected to said antenna, having a transmission port, and having a reception port;
   a local osillator generating oscillations used as a transmission carrier wave located at a frequency included in said transmission frequency channel, at the edge of said transmission frequency channel remote from said adjacent reception frequency channel;
   means for amplitude modulating said transmission carrier wave with a first information signal within said given baseband;
   means for selecting to the transmission port of said circulator that portion of the result of amplitude modulating said transmission carrier wave which is within said transmission frequency channel;
   means for selecting from the reception port of said circulator a reception carrier wave of a frequency included in said reception frequency channel at the edge of said reception frequency channel remote from and adjacent to said transmission frequency channel;
   means for selecting said reception frequency channel from the reception port of said circulator; and
   means for subtractively mixing the selected said second carrier wave and the selected said reception frequency channel to recover a second information signal.

5. A radio-frequency transmitter/receiver as set forth in claim 4 wherein said transmission frequency channel is higher in frequency than said reception frequency channel.

6. A radio-frequency transmitter/receiver as set forth in claim 4 wherein said transmission frequency channel is lower in frequency than said reception frequency channel.

7. A two-way communication system including first and second radio-frequency transmitter/receivers of the type set forth in claim 4, wherein the transmission frequency channel in said first radio-frequency transmitter/receiver is higher in frequency than its said reception frequency channel, wherein the transmission frequency channel in said second radio-frequency transmitter/receiver is lower in frequency than its said reception frequency channel, wherein the transmission carrier wave radiated from the antenna of said first radio-frequency transmitter/receiver is received at the antenna of said second radio-frequency transmitter/receiver as its reception carrier wave, and wherein the transmission carrier wave radiated from the antenna of said second radio-frequency transmitter/receiver is received at the antenna of said first radio-frequency transmitter/receiver as its reception carrier wave.

* * * * *